Patented Feb. 20, 1934

1,947,725

UNITED STATES PATENT OFFICE 1,947,725

AGENTS FOR DIMINISHING OR SUPPRESSING FOAMING AND FROTHING AND THE APPLICATION THEREOF

Arthur Macarthur and Alexander Stewart, Blackley, Manchester, England, assignors to Imperial Chemical Industries Ltd., a corporation of Great Britain No Drawing. Application July 23, 1932, Serial No. 624,362, and in Great Britain July 29, 1931

11 Claims. (Cl. 252—6)

In many industrial operations in which colloidal aqueous solutions, suspensions, or mixtures of various kinds are made or used much trouble arises from the production of foam or froth. This froth or foam production frequently causes delay because it is necessary to wait for the froth or foam to subside, and a mixture or a solution with a tendency to produce a froth or foam will generate that froth or foam when in use, with consequent liability to cause mishaps.

The object of the present invention is to obviate these disadvantages and to provide an agent for diminishing or suppressing the tendency of aqueous solutions, mixtures or the like to produce foam or froth either in course of preparation or in actual use.

The invention also comprises the production of aqueous solutions, suspensions, or mixtures devoid of tendency to foam or froth.

According to the invention we produce an agent for diminishing or suppressing the tendency to foam or froth by dissolving a water insoluble soap of a metal other than an alkali metal in an organic solvent and we obtain aqueous mixtures devoid of frothy or foaming tendency by an addition of the said agent in small proportion.

The water insoluble soaps of metals other than alkali metals used in accordance with the invention are, for example, the stearates of aluminium, barium, calcium, zinc and the like, or the oleates of the same metals.

The organic solvents are, for example, toluene, pine oil, vegetable and animal oils, oleic acid, and the liquid oxygen-containing organic compounds obtainable as a by-product in the known synthesis of oxide of carbon to methanol under pressure. They are preferably such as themselves have the property of suppressing or diminishing the tendency to foam, and comprise such liquids as are not more volatile than water and are capable of dissolving water-insoluble soaps of the kind described.

Preferably, from two to ten percent. by weight of the water-insoluble soap is dissolved in the solvent. A mixed solvent may be used. The proportions are chosen, it will be understood, by reference to the mutual solubilities of the ingredients used.

In making aqueous mixtures devoid of frothing or foaming tendency we add a small proportion, of the order of 1 per cent. by weight, or less, to the mixture, e. g. to an aqueous glue mixture such as is used as a pigment carrying medium.

Other applications of the present invention are to be found in reducing or preventing the foaming tendency of shellac-borax solutions used for instance in leather dressing, of ordinary gum solutions and of boiler feed water to prevent priming, in textile printing and other processes where foaming is liable to occur, for preventing the frothing of calcium chloride solutions used in refrigerators. Further applications will readily suggest themselves, the process being applicable in all cases of foaming in which the small additions made do not prove detrimental or undesirable.

The invention is illustrated but not limited by the following examples, in which the parts are by weight:

Example 1.—5 parts of aluminium stearate is dissolved in 95 parts of pine oil, to give a substantially clear fluid solution.

Example 2.—5 parts of aluminium stearate is dissolved in a mixture of 78.75 parts of pine or eucalyptus oil and 26.25 parts of a mixture of higher alcohols obtainable as a by-product during the manufacture of methanol.

The addition of one per cent. or less of either of the above to a solution of 10 parts of glue and 10 parts of dextrine in 100 parts of water completely prevents the development of foam or froth when the mixture is shaken.

Example 3.—5 parts by weight of aluminium stearate is dissolved in 95 parts of the fraction boiling from 195° C. and up of the liquid oxygen-containing organic compounds obtainable as a by-product in the known synthesis of methanol under pressure from hydrogen and oxide of carbon.

The addition of 1 per cent. or less of the above solution to a solution consisting of 20% of animal glue in $H_2O$ completely prevents the development of foam or froth when the mixture is shaken.

Example 4.—5 parts of zinc stearate is dissolved in 95 parts of pine oil at 95–100° C.

Example 5.—3 parts of calcium oleate is dissolved in 97 parts of pine oil at 95–100° C.

The addition of 0.25% of either of the above two agents to a solution of 10 parts of glue and 10 parts of dextrine in 100 parts of water considerably reduces the amount of foam formed when the mixture is shaken as compared with the amount normally formed.

When 0.25% of pine oil alone is added, the amount of froth formed is also sensibly reduced but still remains about double that formed according to the above process.

*Example 6.*—5 parts of barium stearate is dissolved in 95 parts of oleic acid at 95–100° C.

The addition of ¼% of this agent to glue-dextrine solutions reduces the froth formed on shaking to half the amount formed when ¼% of oleic acid alone has been added.

Various changes may be made in the method described without departing from the invention or sacrificing any of the advantages thereof.

We claim:

1. Process for the improvement of aqueous solutions, pastes or mixtures having tendency to foam which consists in adding thereto an anti-frothing agent comprising a water-insoluble metal soap, dissolved in an organic solvent.

2. Process according to claim 1 in which the organic solvent is pine oil.

3. Process according to claim 1 in which the organic solvent is oleic acid.

4. Process according to claim 1 in which the organic solvent is a mixture of the liquid oxygen-containing organic compounds obtainable as a by-product in the known synthesis of oxide of carbon to methanol under pressure.

5. An anti-frothing agent comprising water-insoluble metal soap dissolved in an organic solvent.

6. An anti-frothing agent comprising aluminium stearate dissolved in an organic solvent.

7. An anti-frothing agent comprising aluminium stearate dissolved in pine oil.

8. An anti-frothing agent comprising aluminium stearate dissolved in oleic acid.

9. An anti-frothing agent comprising aluminium stearate dissolved in a mixture of the liquid oxygen-containing organic compounds obtainable as a by-product in the known synthesis of oxide of carbon to methanol under pressure.

10. Process according to claim 1 in which the organic solvent is a mixture of pine oil and oleic acid.

11. An anti-frothing agent comprising a water-insoluble soap and a mixture of the liquid oxygen-containing organic compounds boiling from 195° C. and above obtainable as a by-product in the known synthesis of oxide of carbon to methanol under pressure.

ARTHUR MACARTHUR.
ALEXANDER STEWART.